(12) United States Patent
Braun et al.

(10) Patent No.: US 6,523,856 B2
(45) Date of Patent: Feb. 25, 2003

(54) RESTRAINT BELT

(75) Inventors: Eleouore Braun, Berlin (DE);
Heinz-Dieter Adomeit, Berlin (DE)

(73) Assignee: Takata-Petri AG, Aschaffenburg (DE)

(*) Notice: Subject to any disclaimer, the term of this patent is extended or adjusted under 35 U.S.C. 154(b) by 0 days.

(21) Appl. No.: 09/949,508

(22) Filed: Sep. 6, 2001

(65) Prior Publication Data

US 2002/0030353 A1 Mar. 14, 2002

Related U.S. Application Data

(63) Continuation of application No. PCT/DE00/00683, filed on Mar. 3, 2000.

(30) Foreign Application Priority Data

Mar. 9, 1999 (DE) .......................................... 199 11 681

(51) Int. Cl.$^7$ .............................................. B60R 21/18
(52) U.S. Cl. ...................................... 280/733; 280/808
(58) Field of Search ............................. 280/733, 801.1, 280/801.2, 803, 808, 806

(56) References Cited

U.S. PATENT DOCUMENTS

| | | | | |
|---|---|---|---|---|
| 3,430,979 A | * | 3/1969 | Terry et al. | 280/733 |
| 3,706,462 A | | 12/1972 | Lilly | 280/150 |
| 3,866,940 A | | 2/1975 | Lewis | 280/150 |
| 3,933,370 A | | 1/1976 | Abe et al. | 280/150 |
| 4,741,574 A | * | 5/1988 | Weightman et al. | 280/733 |
| 5,062,662 A | * | 11/1991 | Cameron | 280/733 |
| 5,076,608 A | * | 12/1991 | Shimose | 280/733 |
| 5,162,006 A | * | 11/1992 | Yandle, II | 280/733 |
| 5,474,326 A | * | 12/1995 | Cho | 280/733 |
| 5,863,065 A | * | 1/1999 | Boydston et al. | 280/730.1 |
| 5,871,230 A | * | 2/1999 | Lewis | 280/733 |
| 6,062,596 A | * | 5/2000 | Boydston et al. | 280/733 |
| 6,325,412 B1 | * | 12/2001 | Pan | 180/268 |

FOREIGN PATENT DOCUMENTS

| | | | | |
|---|---|---|---|---|
| DE | 1 902 793 | | 8/1970 | |
| DE | 2 358 070 | | 6/1974 | |
| DE | 2401 578 | | 7/1974 | |
| DE | 3432669 | * | 3/1986 | 280/808 |
| DE | 3741831 | * | 6/1989 | 280/808 |
| DE | 3820145 C2 | | 5/1990 | |
| DE | 43 06 528 A1 | | 9/1994 | |
| DE | 9418721 U1 | | 5/1996 | |
| EP | 532378 | * | 3/1993 | 280/808 |
| EP | 0 652 140 A1 | | 5/1995 | |
| GB | 2 262 720 A | | 6/1993 | |

* cited by examiner

Primary Examiner—Paul N. Dickson
Assistant Examiner—Toan C To
(74) Attorney, Agent, or Firm—Foley & Lardner

(57) ABSTRACT

A restraint belt for occupants of vehicles having an air bag module which is provided in the pelvic area. The restraint belt extends as a double belt in the lap of the occupant. The first section of the double belt rests directly on the body of the occupant. The second section rests at least partially on the side of the first section facing away from the body of the occupant. The belt reverses direction as it transitions from the first section into the second section. The airbag module is placed on the second section of the double belt. The configuration of the restraint belt provides for a restraint effect of any airbag at the same time that the tension of the belt is increased, and to attain an additional tensioning effect.

12 Claims, 2 Drawing Sheets

RESTRAINT BELT

CROSS-REFERENCE TO RELATED PATENT APPLICATIONS

This is a continuation of International Application PCT/DE00/00683, which has an international filing date of Mar. 3, 2000; this International Application was not published in English but in German as WO 00/53461.

BACKGROUND

The invention relates to a restraint belt for vehicle occupants. More particularly, the invention pertains to an inflatable restraint belt having an air bag module provided on the lap belt.

U.S. Pat. No. 3,866,940, DE-A 2 358 070 and DE 94 18 721 U1 disclose three-point restraint belts for motor vehicles, in which an airbag is fitted on the lap belt portion of the restraint belt. The lap belt runs from a mount on the outside of the motor vehicle to the belt buckle. The lap belt is deflected there and continues as the shoulder belt which typically ends in an automatic retractor.

However, these arrangements have the disadvantage that when the airbag in the lap belt is triggered, the lap belt is moved by the airbag away from the occupant. As a result, the restraining action of the belt system is neutralized. It is even possible for this to cause "slipping through" (submarining) of the occupant. The same disadvantage may occur if a customary, standard lap belt is used.

SUMMARY

The present invention provides an inflatable lap belt that maintains the restraining action of the belt after inflation of an airbag attached to the belt. According to the present invention, a restraint belt for vehicle occupants is provided. The restraint belt comprises a restraint belt which runs in the lap of the occupant as a double belt. The double belt includes a first section that bears directly on the body of the occupant, and a second section that at least partially overlies that side of the first section which is not in contact with the body of the occupant. The first section merges (i.e., is integrally connected) into the second section at a belt-deflecting point. An airbag module is fitted to the second section of the double belt. The airbag module includes a pocket for retaining the airbag.

The present invention is configured so that the effect that the second section of the restraint belt, which section lies at least partially in front of or above the first section, moves away from the occupant during the deployment phase by the reaction forces of the airbag, which is fastened to it. However, the first section is tightened at the same time. Therefore, in addition to the restraining effect of the airbag, the double belt results in a tightening effect in the restraint belt.

It is to be understood that both the foregoing general description and the following detailed description are exemplary and explanatory only, and are not restrictive of the invention as claimed.

This restraint system according to the invention can be used on all seats in vehicles, cars, trucks, including buses and airplanes. At present there are either no restraint systems or inadequate restraint systems particularly on the rear seats in cars and on seats in buses. This is also true of the driver's seat in buses and trucks where the steering column is situated at a very steep angle. As a result, known airbag systems are not able to function adequately.

In one embodiment of the present invention, the restraint belt is arranged so that the double belt runs over the thighs of the occupant and the first section and the second section lie one above the other. This allows the airbag to deploy vertically upwards in the chest region, so that, on the one hand, it does not strike the occupant but, on the other hand, the airbag is not from spreading out by vehicle subassemblies.

In another embodiment, a three-point belt is provided in which a belt-deflecting point is provided in the region of the belt buckle, which is arranged at the customary location. The shoulder section of the belt merges into the first section of the lap belt at the belt-deflecting point.

However, in an alternative embodiment, the restraint belt may be designed just as a lap belt. In this embodiment, the belt-deflecting point for the transition of the first section into the second section is provided on the belt buckle.

The airbag module may be fastened on the second section of the lap belt by means of a pocket which is fitted onto the said second section between two fixing points, i.e. the airbag module is arranged between these fixing points. The fixing points may be displaceable in their position. It is thereby possible to displace the airbag module laterally and to adapt the position thereof to occupants of differing sizes.

Furthermore, it is expedient for a gas generator to be fastened to one side of the restraint belt and to be connected to the airbag via a gas supply line. The gas generator may, for example, be arranged under the seat or on the seat, on the vehicle body, on the floor or in the trunk of the vehicle.

BRIEF DESCRIPTION OF THE DRAWINGS

The invention will be explained in exemplary embodiments with reference to drawings, in which.

Figure 1:
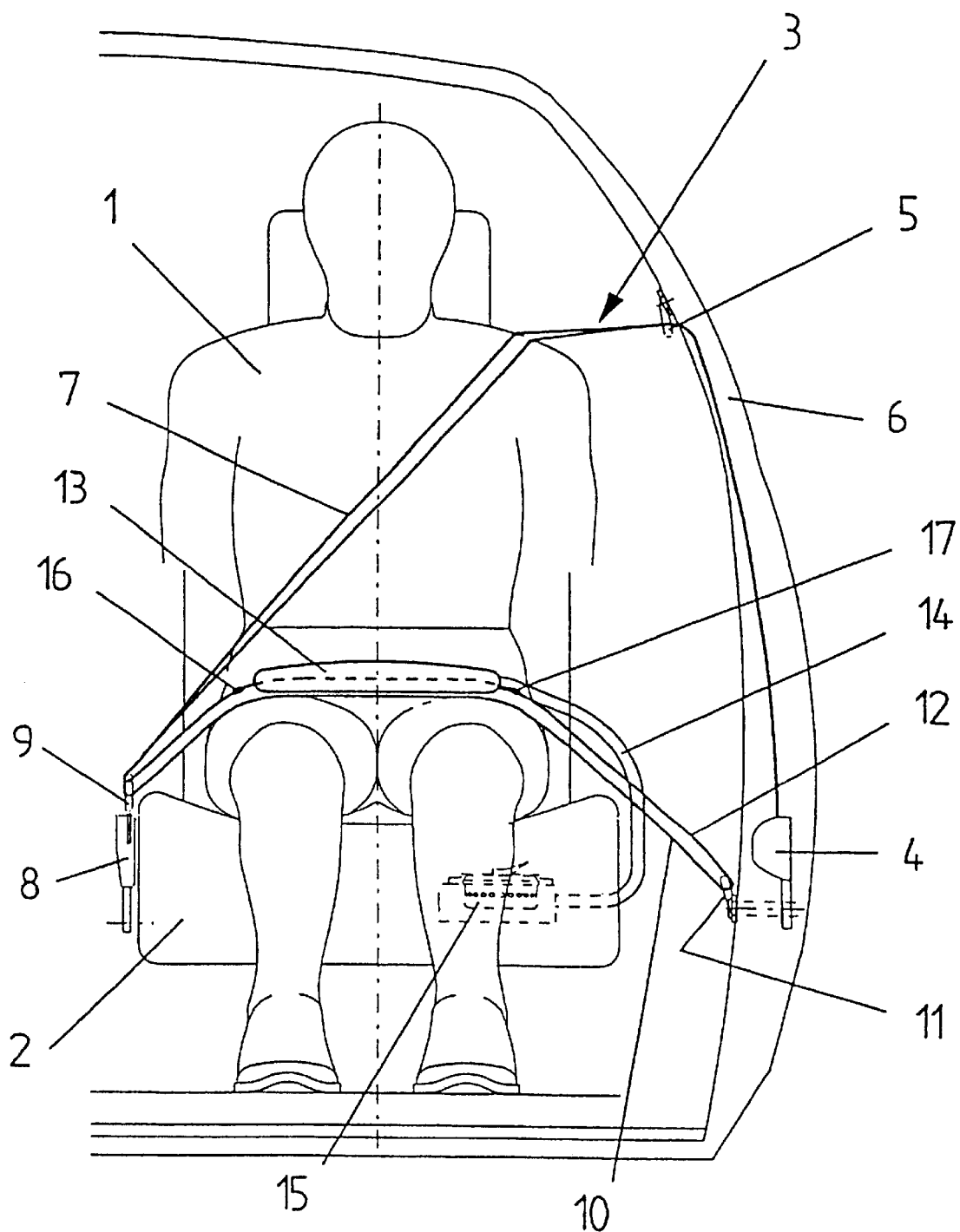
FIG. 1 is a front view of an occupant restrained by a threepoint belt.

These and other features, aspects and advantages of the present invention will become apparent from the following description, appended claims, and the accompanying exemplary embodiments shown in the drawings, which are briefly described below.

DETAILED DESCRIPTION

FIG. 1 discloses an occupant 1 in a motor vehicle whose sitting position on a seat 2 is secured by means of a three-point belt 3. The three-point belt extends from an automatic retractor 4 via a beltdeflecting point 5, which is fastened to the B-pillar or C-pillar 6, to the occupant 1. A shoulder section 7 of the three-point belt 3 extends in a known manner from one shoulder diagonally over the upper part of the body to a belt buckle 8. The belt is deflected at the buckle in a belt-deflecting point 9 and extends as a first section 10 of a double belt in the pelvic area over the thighs of the occupant to a further belt-deflecting point 11. After being deflected again, the belt extends with a second section 12 above the first section 10 back to the belt buckle 8. The end of the second section is fastened at the buckle 8.

An airbag module 13 is fastened on the second section 12, which lies above the first section 10. The module 13 includes a pocket 19 which is fixed to the second section 12 between two points 16, 17. The points at which the module 11 is connected to the belt may be fixed or displaced. An airbag is arranged in the said pocket. The airbag is connected via a gas supply line 14 to a gas generator 15, which may be positioned in the seat 2. As mentioned above, the gas generator 5 may alternatively be located under the seat, secured to the vehicle bag or located in the trunk 21.

After the gas generator 15 is ignited, the airbag deploys upwardly causing the upper, second section 12 of the double belt having the airbag module to move away from the occupant. Since the upper, second section 12 merges via the belt-deflecting point 11 into the lower, first section 10, the first section 10 is therefore tightened thereby preventing the occupant from slipping through or under the lap belt. Since the first section 10 merges at the deflecting point 9 on the belt buckle 8 into the shoulder section 7, this section is also tightened, with the result that the occupant is additionally secured in his sitting position.

Figure 2:
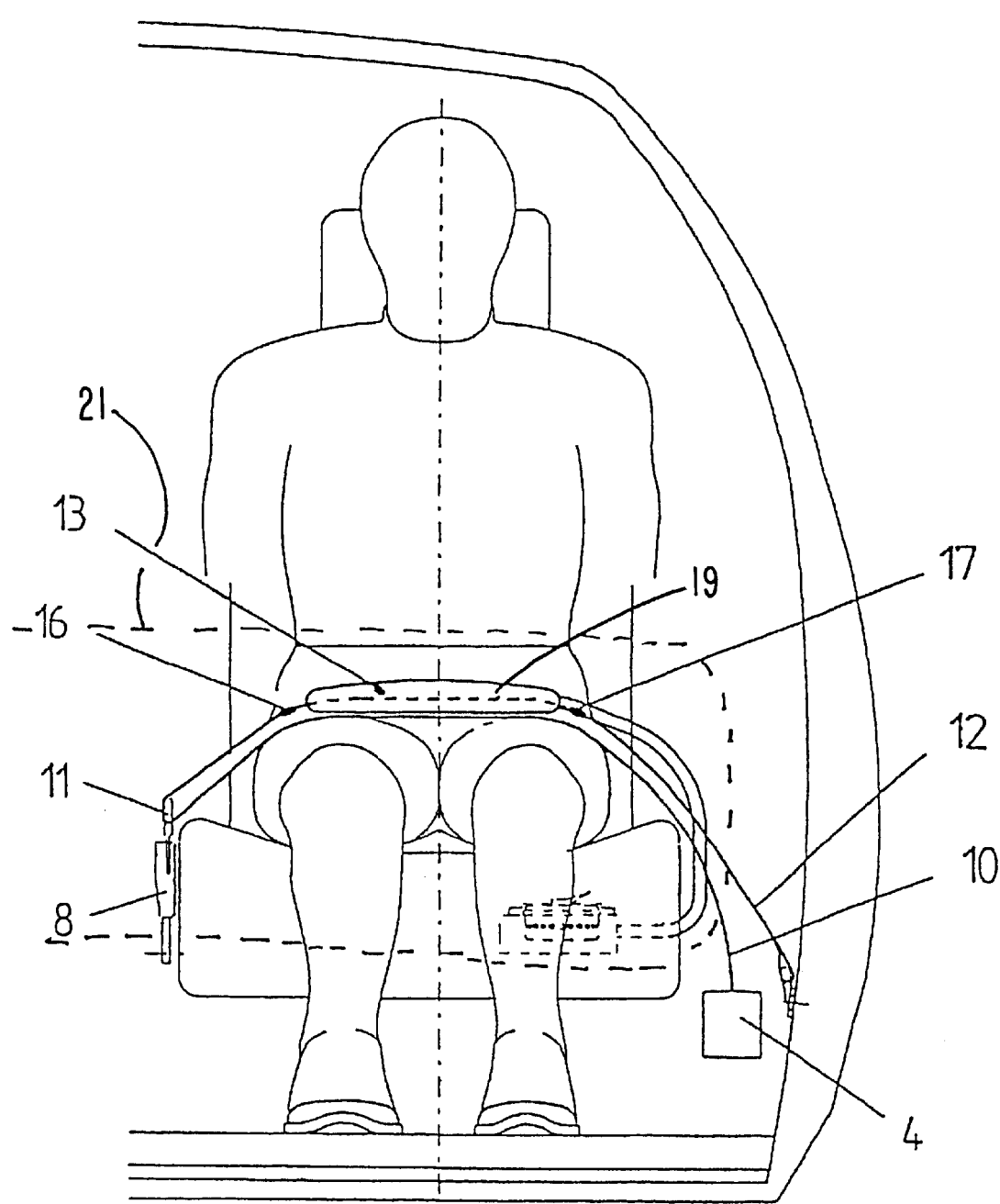
FIG. 2 is a front view of an occupant restrained by a pelvic belt.

In the exemplary embodiment of FIG. 2, the vehicle occupant is secured only by a lap belt, which is designed as a double belt. Similar to the embodiment shown in FIG. 1, this double belt has a first section 10 which starts from the automatic retractor 4 and merges at the belt-deflecting point 11 into the second section 12. The belt-deflecting point 11 may be provided on the belt buckle 8. The second section 12, lies above the first section 10 and is fastened to the motor vehicle in the region of the automatic retractor 4. As in the exemplary embodiment of FIG. 1, the airbag module 13 is fastened to the second section. The manner of operation of the embodiment shown in FIG. 2 corresponds to the double belt of the exemplary embodiment of FIG. 1.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A restraint belt for an occupant positioned in a seat of a vehicle comprising:
   a lap belt having a first and a second section integrally connected at a belt-deflecting point, wherein the first section is configured to contact the occupant and the second section overlies the first section; and
   an airbag module connected to the second section;
   wherein the airbag module is fixed to the second section at two points; and
   wherein each of the two points are displaceable away from the first section in response to inflation of an airbag included in the air bag module to tighten the lap belt on the occupant.

2. The restraint belt of claim 1, wherein the belt-deflecting point is located in the area of a belt buckle.

3. The restraint belt of claim 1, further comprising a shoulder section integrally connected to the first section of the lap belt.

4. The restraint belt of claim 1, wherein the airbag module includes a pocket for retaining an airbag.

5. The restraint belt of claim 1, wherein a gas generator is connected to the airbag module via a gas supply line.

6. The restraint belt of claim 5, wherein the gas generator is arranged under the seat or on the seat.

7. The restraint belt of claim 5, wherein the gas generator is located in the trunk of the vehicle.

8. A lap belt for an occupant positioned in a seat of a vehicle comprising:
   a first section;
   a second section integrally connected to the first section at a belt-deflecting point, wherein the first section is configured to contact the occupant and the second section overlies the first section; and
   an airbag module connected to the second section;
   wherein the second section is displaceable with respect to the first section in response to inflation of an airbag included in the air bag module to tighten the first section against the occupant.

9. The lap belt of claim 8, wherein the airbag module includes an airbag positioned so that when the airbag inflates the first section remains in contact with the occupant.

10. A three-point belt for an occupant positioned in a seat of a vehicle comprising:
    a lap belt having a first section and a second section integrally connected at a first belt-deflecting point, and wherein the first section is configured to contact the occupant and the second section overlies the first section;
    a shoulder section integrally connected to the first section of the lap belt at a second belt-deflecting point; and
    an airbag module connected to the second section of the lap belt;
    wherein the second section is displaceable with respect to the first section in response to inflation of an airbag included in the air bag module to tighten the first section against the occupant.

11. A restraint belt for an occupant positioned in a seat of a vehicle comprising:
    a lap belt which slidably passes through a belt deflecting point so as to have a first section which directly contacts the seat occupant and a second section that passes back over the first section so as to overlie the first section; and
    an airbag module connected to the second section so that inflation of an air bag module forces the second section away from the first section and draws some of the first section through the belt deflecting point tightening the remaining first portion of the belt against the occupant.

12. A restraint belt for an occupant positioned in a seat of a vehicle comprising:
    a belt tightening arrangement comprising: a lap belt slidably passes through a belt deflecting point so as to have a first section which directly contacts the seat occupant and a second section that passes back over the first section so as to overlie the first section; and
    an airbag module connected to the second section so that at least a portion of an air bag of the air bag module deploys between the first and second sections of the belt and forces the second section away from the first section causing a portion of the first section to slide through the belt deflecting point and cause the first portion to tighten against the occupant.

* * * * *